US011292156B2

(12) United States Patent
Sandholzer et al.

(10) Patent No.: US 11,292,156 B2
(45) Date of Patent: Apr. 5, 2022

(54) PROCESS FOR PRODUCING PELLETS OF COPOLYMERS OF PROPYLENE

(71) Applicant: BOREALIS AG, Vienna (AT)

(72) Inventors: Martina Sandholzer, Linz (AT); Klaus Bernreitner, Linz (AT); Hermann Braun, Linz (AT); Hermann Prokschi, Wartberg ob der Aist (AT); Ulrich Schreider, Tann (DE); Frank Schroder, Naunhof OT Albrechtshain (DE); Thomas Hager, Garching/Hart (DE); Katja Klimke, Linz (AT); Markus Gahleitner, Neuhofen/Krems (AT)

(73) Assignee: Borealis AG, Vienna (AT)

( * ) Notice: Subject to any disclaimer, the term of this patent is extended or adjusted under 35 U.S.C. 154(b) by 355 days.

(21) Appl. No.: 15/534,447

(22) PCT Filed: Dec. 7, 2015

(86) PCT No.: PCT/EP2015/078823
§ 371 (c)(1),
(2) Date: Jun. 8, 2017

(87) PCT Pub. No.: WO2016/091803
PCT Pub. Date: Jun. 16, 2016

(65) Prior Publication Data
US 2017/0341267 A1 Nov. 30, 2017

(30) Foreign Application Priority Data
Dec. 8, 2014 (EP) .................................... 14196772

(51) Int. Cl.
B29B 9/06 (2006.01)
B29C 48/04 (2019.01)
B29B 9/12 (2006.01)
C08L 23/14 (2006.01)
C08K 5/00 (2006.01)
C08L 23/16 (2006.01)
B29B 9/16 (2006.01)

(52) U.S. Cl.
CPC ............... B29B 9/065 (2013.01); B29B 9/12 (2013.01); B29C 48/04 (2019.02); C08K 5/0083 (2013.01); C08L 23/142 (2013.01); C08L 23/16 (2013.01); B29B 9/16 (2013.01); B29B 2009/165 (2013.01); C08L 2205/24 (2013.01); C08L 2207/02 (2013.01)

(58) Field of Classification Search
CPC .. B29B 9/065; B29B 9/12; B29B 9/16; B29B 2009/165; C08K 5/0083; C08L 23/16; C08L 23/142; C08L 2205/24; C08L 2207/02; B29C 48/04
See application file for complete search history.

(56) References Cited

U.S. PATENT DOCUMENTS

| 622,967 | A | 4/1899 | Morrison |
| 3,324,093 | A | 6/1967 | Alleman |
| 3,405,109 | A | 10/1968 | Rohlfing |
| 4,451,589 | A | 5/1984 | Morman et al. |
| 4,532,311 | A | 7/1985 | Fulks et al. |
| 4,543,399 | A | 9/1985 | Jenkins et al. |
| 4,578,879 | A | 4/1986 | Yokoyama et al. |
| 4,582,816 | A | 4/1986 | Miro |
| 4,621,952 | A | 11/1986 | Aronson |
| 4,803,251 | A | 2/1989 | Goode et al. |
| 4,822,546 | A * | 4/1989 | Lohkamp ................ B29B 9/065 264/143 |
| 4,855,370 | A | 8/1989 | Chirillo et al. |
| 4,933,149 | A | 6/1990 | Rhee et al. |
| 5,026,795 | A | 6/1991 | Hogan |
| 5,391,654 | A | 2/1995 | Ahvenainen et al. |
| 5,611,983 | A | 3/1997 | Ma et al. |
| 6,313,227 | B1 * | 11/2001 | Tanaka ................ C08F 297/083 525/240 |
| 6,746,738 | B1 | 6/2004 | Le Roy et al. |
| 7,312,280 | B2 | 12/2007 | Kondo et al. |
| 2004/0209082 | A1 | 10/2004 | Lee et al. |
| 2006/0279019 | A1 | 12/2006 | Di Federico et al. |
| 2009/0051061 | A1 * | 2/2009 | Seibring ................ B29C 48/30 264/5 |
| 2009/0218052 | A1 * | 9/2009 | DeBruin ................ B29B 9/065 159/47.1 |
| 2011/0086970 | A1 * | 4/2011 | Grein .................... C08F 210/16 524/528 |

(Continued)

FOREIGN PATENT DOCUMENTS

DE 102004018436 A1 11/2005
EP 47077 A1 3/1982

(Continued)

OTHER PUBLICATIONS

Geldart "Gas Fluidization Technology", J. Wiley & Sons (1986) p. 17-18, 169-186, 183.

(Continued)

Primary Examiner — Jacob T Minskey
Assistant Examiner — Caroline Beha
(74) Attorney, Agent, or Firm — Ditthavong, Steiner & Mlotkowski

(57) ABSTRACT

The present invention provides a process for extruding and pelletising a propylene copolymer. The copolymer has a content of comonomer from 5 to 40% by mole, a melt flow rate $MFR_2$ measured at 230° C. under a load of 2.16 kg of from 0.5 to 15 g/10 min and a content of cold xylene soluble material of from 20 to 60% by weight. The process comprises extruding the propylene copolymer through a die plate into an underwater pelletiser and cutting strands of the propylene copolymer into pellets in the underwater pelletiser, wherein the ratio of the mass flow rate of the propylene copolymer to the mass flow rate of the cooling water is from 0.020 to 0.060; and the propylene copolymer comprises a polymeric nucleating agent.

19 Claims, No Drawings

(56) References Cited

U.S. PATENT DOCUMENTS

| | | | | |
|---|---|---|---|---|
| 2011/0130513 A1* | 6/2011 | Chiang | ............... | B29B 9/065 524/599 |
| 2012/0053278 A1* | 3/2012 | Malucelli | ............... | B29B 9/16 524/400 |

FOREIGN PATENT DOCUMENTS

| | | | |
|---|---|---|---|
| EP | 188125 | A2 | 7/1986 |
| EP | 250169 | A2 | 12/1987 |
| EP | 0261027 | A1 | 3/1988 |
| EP | 372239 | A2 | 6/1990 |
| EP | 479186 | A2 | 4/1992 |
| EP | 499759 | A1 | 8/1992 |
| EP | 560035 | A1 | 9/1993 |
| EP | 579426 | A1 | 1/1994 |
| EP | 600414 | A1 | 6/1994 |
| EP | 607703 | A1 | 7/1994 |
| EP | 629631 | A2 | 12/1994 |
| EP | 629632 | A2 | 12/1994 |
| EP | 683176 | A1 | 11/1995 |
| EP | 707513 | A1 | 4/1996 |
| EP | 721798 | A2 | 7/1996 |
| EP | 699213 | B1 | 2/1998 |
| EP | 684871 | A | 5/1998 |
| EP | 1028984 | B1 | 11/1998 |
| EP | 1028985 | B1 | 11/1998 |
| EP | 887379 | A | 12/1998 |
| EP | 887380 | A | 12/1998 |
| EP | 887381 | A | 12/1998 |
| EP | 891990 | A2 | 1/1999 |
| EP | 696293 | B1 | 5/2000 |
| EP | 1074557 | A2 | 2/2001 |
| EP | 1030878 | B1 | 10/2001 |
| EP | 1415999 | A1 | 5/2004 |
| EP | 1591460 | A | 11/2005 |
| EP | 991684 | A | 1/2006 |
| EP | 1860125 | A | 11/2007 |
| EP | 2368921 | A | 9/2011 |
| EP | 2535372 | A1 | 12/2012 |
| EP | 2535372 | A1 * 12/2012 | ............ C08F 10/06 |
| EP | 2546298 | A1 | 1/2013 |
| EP | 2548920 | A1 | 1/2013 |
| EP | 2557096 | A1 | 2/2013 |
| EP | 2557118 | A1 | 2/2013 |
| EP | 2573134 | A1 | 3/2013 |
| EP | 2610271 | A1 | 7/2013 |
| EP | 2610272 | A1 | 7/2013 |
| EP | 2615135 | A1 | 7/2013 |
| GB | 1272778 | A | 5/1972 |
| JP | 2004285142 | A | 10/2004 |
| WO | 99/12943 | A1 | 3/1993 |
| WO | 94/25495 | A1 | 11/1994 |
| WO | 1997/047682 | A1 | 12/1997 |
| WO | 98/40331 | A1 | 9/1998 |
| WO | 99/42497 | A1 | 8/1999 |
| WO | 00/26258 | A1 | 5/2000 |
| WO | 00/26266 | A1 | 5/2000 |
| WO | 00/29452 | A1 | 5/2000 |
| WO | 01/05845 | A1 | 1/2001 |
| WO | 02/002575 | A1 | 1/2002 |
| WO | 02/002576 | A1 | 1/2002 |
| WO | 02/088194 | A1 | 11/2002 |
| WO | 2003/000754 | A1 | 1/2003 |
| WO | 2003/000757 | A1 | 1/2003 |
| WO | 2004/029112 | A1 | 4/2004 |
| WO | 2005087361 | A | 9/2005 |
| WO | 2007025640 | A1 | 3/2007 |
| WO | 2007093376 | A1 | 8/2007 |
| WO | 2007/137853 | A1 | 12/2007 |
| WO | 2012/007430 | A1 | 1/2012 |
| WO | 2013092624 | A1 | 6/2013 |
| WO | WO-2013092624 | A1 * 6/2013 | ............ C08F 210/06 |
| WO | 2013144060 | A1 | 10/2013 |
| WO | 2013144061 | A1 | 10/2013 |
| WO | 2014075972 | A1 | 5/2014 |
| WO | 2014075973 | A1 | 5/2014 |
| WO | 2014090818 | A1 | 6/2014 |

OTHER PUBLICATIONS

Geldart et al., "The Design of Distributors for Gas-fluidized Beds", Powder Technology, vol. 42, 1985.

International Search Report and Written Opinion of PCT/EP2015/078823 dated Mar. 11, 2016.

Notification of Concerning Transmittal of Copy of International Preliminary Report on Patentability and Written Opinion of the International Searching Authority; PCT/EP2015/078823 dated Jun. 22, 2017.

"Plastics—Determination of xylene-soluble matter in polypropylene"; International Standard, ISO 16152; First edition; Jul. 1, 2005; pp. 1-7.

* cited by examiner

PROCESS FOR PRODUCING PELLETS OF COPOLYMERS OF PROPYLENE

FIELD OF THE INVENTION

The present invention is directed to a process for producing propylene polymers. Especially, the present invention is directed to a process for producing soft copolymers of propylene in pellet form.

PROBLEM TO BE SOLVED

Copolymers of propylene with a comonomer selected from ethylene and alpha-olefins having from 4 to 10 carbon atoms and containing from 7 to 20% by weight of comonomer and a content of xylene cold soluble (XCS) fraction of from 20 to 60% by weight have a unique combination of softness, retortability, impact strength and optical properties.

In the polymer production process the polymer is generally extruded and cut to pellets. In the extrusion stage the polymer is heated and melted. The melt is then pressed through a die plate, usually into a water bath. The molten strands then solidify due to the cooling effect of the water. After the die plate there is usually a rotating cutter which cuts the solidified strands to pellets. The pellets are then dried and transported to a silo for storage and packaging.

A frequently used step in drying the pellets is to pass the slurry containing water and pellets to a sieve. The water passes through the sieve while the pellets are trapped by it and are conveyed to subsequent process steps.

However, because the polymer is soft the pellets tend to adhere, for instance, to the walls of the process apparatus. Especially the pellets have a strong tendency of adhering to each other, for instance during the pelletisation, transport or storage. As these soft copolymers have a high comonomer content from 7 to 20%, the crystallization speed is reduced, contributing to these adhesion and aggregation tendencies. This may result in problems in the pelletisation process itself and also in plugging of the conveying pipeline or storage container. Further, upsets may occur in subsequent process steps aimed at forming end-use articles from the pellets. Formation of multiples (such as doubles) in large amount in the pelletisation process is a clear sign of reduced pellet quality.

EP-A-2368921 discloses a process for producing soft polypropylene particles directly in a polymerisation process where the particles have improved flowability. The document is not related to a method of improving the flow of polymer pellets obtained after the extrusion step.

U.S. Pat. No. 4,451,589 discloses a process where propylene polymers were treated in an extruder in the presence of a free-radical generating agent. The document does not specifically discuss soft copolymers of propylene containing from 7 to 20% by weight of comonomer respectively a content of xylene cold soluble (XCS) fraction of from 20 to 60% by weight. The melt index of the polymer in the examples was initially between 10 and 60 g/10 min and was increased after the extrusion step to between 400 and 600 g/10 min.

Also U.S. Pat. Nos. 4,822,546 and 5,611,983 are directed to treating polypropylene in an extruder in the presence of a free-radical generating agent. Special types of die plates were used to obtain a smooth shape of the pellets.

US-A-2004/0209082 discloses a process for coating tacky or soft polymer pellets. The pellets were coated with fine powder selected from talc, magnesium silicate, calcium silicate, calcium carbonate, cellulose, wood fibre, polyolefin wax and silica. The powders were used together with a binder. Such coating agents and binders will end up in the final articles produced from these polymers, deteriorating their mechanical and optical performance.

JP-A-2004285142 discloses a process where the pellets are cut under water and the temperature of the cooling water, the concentration of the polymer in the water and the crystallisation temperature of the polymer meet a specific inequality. The respective requirements to the polymer design limit the design freedom in terms of mechanical and optical performance.

WO-A-2007/093376 discloses a method where a polymer which has been nucleated by using a polymeric nucleating agent is used in an amount of up to 50%, most preferably up to 10% for nucleating a non-nucleated polymer. Aspects of pelletisation are not discussed in this document.

WO-A-2013144060 discloses a polymer composition comprising a heterophasic copolymer of propylene with ethylene and a styrene-based elastomer. In the example section RAHECO 4 was produced by polymerising propylene and comonomer in the presence of a polymerisation catalyst which had been prepolymerised with vinylcyclohexane. The content of the polyvinylcyclohexane in the final polymer was reported to be 200 ppm. The reactor-made polymer of RAHECO 4 had $MFR_2$ of 1.8 g/10 min. The polymer was subsequently visbroken and the final polymer had $MFR_2$ of 3.5 g/10 min. Aspects of pelletisation are not discussed in this document.

WO-A-2013144061 has a similar disclosure as WO-A-2013144060 and the disclosure for RAHECO 2 in the example section corresponds to that of RAHECO 4 of WO-A-2013144060.

WO-A-2014075972 discloses a polymer composition comprising a preferably α-nucleated heterophasic copolymer where the nucleating agent is preferably a polymer of vinylcycloalkane, such as vinylcyclohexane. In the examples a catalyst which had been prepolymerised with vinylcyclohexane was used. The content of polyvinylcyclohexane in the final polymer was reported to be 200 ppm. Aspects of pelletisation are not discussed in this document.

WO-A-2014075973 has a similar disclosure as WO-A-2014075972.

WO-A-2014090818 discloses a copolymer of propylene with ethylene which had been nucleated by using a nucleating agent which preferably was a polymer of vinylcycloalkane, such as vinylcyclohexane. In the examples a catalyst which had been prepolymerised with vinylcyclohexane was used. The content of polyvinylcyclohexane in the final polymer was reported to be 200 ppm. Aspects of pelletisation are not discussed in this document.

In spite of the prior art there is still a need for an economical, safe and efficient process for producing pellets of soft propylene copolymers which reduces the agglomeration tendency of the pellets. Especially it is desired that in the process having the above-mentioned benefits the fraction of partially fused pellets, also known as multiples, is reduced.

SUMMARY OF THE INVENTION

The present invention provides a process for extruding and pelletising a propylene copolymer having a content of comonomer from 5 to 40% by mole, a melt flow rate $MFR_2$ measured at 230° C. under a load of 2.16 kg of from 0.5 to 15 g/10 min and a content of xylene cold soluble (XCS) fraction of from 20 to 60% by weight, said process comprising extruding the propylene copolymer through a die plate into an underwater pelletiser and cutting strands of the propylene copolymer into pellets in the underwater pelletiser, wherein the ratio of the mass flow rate of the propylene copolymer to the mass flow rate of the cooling water is from 0.020 to 0.060; and the propylene copolymer comprises a polymeric nucleating agent.

DETAILED DESCRIPTION

The present invention is directed to a process of extruding soft copolymers of propylene (A) and cutting the extrudate to pellets. The pellets produced by the process have improved behaviour in the subsequent process steps and are less prone to agglomeration and clogging. Thereby the down-time in the process steps following the extrusion is reduced. Further, the pellets have reduced tendency to cause problems in silos and packages.

The propylene copolymers (A) involved in the process of the invention are soft copolymers of propylene. Especially, the soft copolymers of propylene (A) are heterophasic copolymers of propylene, comprising a semicrystalline matrix and an amorphous dispersed phase.

The propylene copolymer (A) has a content of comonomer from 5 to 40% by mole, preferably from 8 to 35% by mole, more preferably from 10 to 30% by mole and especially preferably from 10 to 25% by mole. Further, the propylene copolymer (A) has a melt flow rate $MFR_2$ measured at 230° C. under a load of 2.16 kg of from 0.5 to 15 g/10 min, preferably from 1 to 10 g/10 min. Further, the propylene copolymer (A) preferably has a content of cold xylene soluble material of from 20 to 60% by weight, more preferably from 25 to 55% by weight, even more preferably from 30 to 52% by weight and in particular from 35 to 50% by weight. In addition, the propylene copolymer (A) preferably has a flexural modulus of from 200 to 600 MPa, more preferably from 200 to 500 MPa and even more preferably from 250 to 400 MPa.

The propylene copolymers which are useful in the process of the invention are as such known to the person skilled in the art and they are disclosed, among others, in EP-A-2546298, EP-A-2548920, EP-A-2557096, EP-A-2557118, EP-A-2615135, EP-A-2573134 and WO-A-2013/092624.

Heterophasic Copolymers of Propylene

The propylene copolymer (A) is preferably a heterophasic copolymer of propylene. In such polymers there is a semicrystalline matrix in which an elastomeric amorphous phase is dispersed.

The matrix may be a propylene homopolymer or a random copolymer of propylene with at least one comonomer selected from the group consisting of ethylene and alpha-olefins and dienes having 4 to 12 carbon atoms. It preferably has a melt flow rate $MFR_2$ of from 0.5 to 20 g/10 min, more preferably from 1 to 10 g/10 min. Further, if it is a random copolymer then it preferably contains from 0.1 to 15% by mole of the comonomer, more preferably from 1 to 10% by mole.

The elastomeric component is a random copolymer of propylene with at least one comonomer selected from the group consisting of ethylene and alpha-olefins and dienes having 4 to 12 carbon atoms. The elastomeric component typically contains from 20 to 80% by mole, preferably from 25 to 75% by mole and even more preferably from 30 to 70% by mole of the comonomer(s).

Typically the heterophasic copolymer contains from 50 to 85% by weight, preferably from 50 to 80% by weight and even more preferably from 55 to 75% of the matrix and from 15 to 50% by weight, preferably from 20 to 50% by weight and even more preferably from 25 to 45% by weight of the elastomeric copolymer.

The heterophasic copolymer can be produced in any suitable polymerisation process, such as in slurry or gas phase polymerisation or a combination thereof. However, as the heterophasic copolymer comprises two components, the matrix and the elastomeric phase, then usually at least two polymerisation stages are needed for producing the heterophasic copolymer.

When the polymerisation is conducted in slurry the polymer particles formed in the polymerisation, together with the catalyst fragmented and dispersed within the particles, are suspended in the fluid hydrocarbon. The slurry is agitated to enable the transfer of reactants from the fluid into the particles.

Slurry polymerisation is preferably a so-called bulk polymerisation. By "bulk polymerisation" is meant a process where the polymerisation is conducted in a liquid monomer essentially in the absence of an inert diluent. However, as it is known to a person skilled in the art the monomers used in commercial production are never pure but always contain aliphatic hydrocarbons as impurities. For instance, the propylene monomer may contain up to 5% of propane as an impurity. As propylene is consumed in the reaction and also recycled from the reaction effluent back to the polymerisation, the inert components tend to accumulate, and thus the reaction medium may comprise up to 40% by weight of other compounds than monomer. It is to be understood, however, that such a polymerisation process is still within the meaning of "bulk polymerisation", as defined above.

The temperature in the slurry polymerisation is typically from 50 to 110° C., preferably from 60 to 100° C. and in particular from 65 to 95° C. The pressure is from 1 to 150 bar, preferably from 10 to 100 bar.

The slurry polymerisation may be conducted in any known reactor used for slurry polymerisation. Such reactors include a continuous stirred tank reactor and a loop reactor. It is especially preferred to conduct the polymerisation in loop reactor. In such reactors the slurry is circulated with a high velocity along a closed pipe by using a circulation pump. Loop reactors are generally known in the art and examples are given, for instance, in U.S. Pat. Nos. 4,582, 816, 3,405,109, 3,324,093, EP-A-479186 and U.S. Pat. No. 5,391,654.

The slurry may be withdrawn from the reactor either continuously or intermittently, preferably continuously. Continuous withdrawal is disclosed, among others, in EP-A-891990, EP-A-1415999, EP-A-1591460 and EP-A-1860125. The continuous withdrawal may be combined with a suitable concentration method, as disclosed in EP-A-1860125 and EP-A-1591460.

Into the slurry polymerisation stage other components may also be introduced as it is known in the art. Thus, hydrogen can be used to control the molecular weight of the polymer. Process additives may also be introduced into the reactor to facilitate a stable operation of the process.

When the slurry polymerisation stage is followed by a gas phase polymerisation stage it is preferred to conduct the slurry directly into the gas phase polymerisation zone without a flash step between the stages. This kind of direct feed is described in EP-A-887379, EP-A-887380, EP-A-887381 and EP-A-991684.

When the polymerisation is conducted in gas phase it may be conducted in a fluidised bed reactor, in a fast fluidised bed reactor or in a settled bed reactor or in any combination of these. Preferably, the polymerisation is conducted in a fluidised bed reactor.

In a fluidised bed gas phase reactor propylene is copolymerised in the presence of the polymerisation catalyst in an upwards moving gas stream. The reactor typically contains a fluidised bed comprising the growing polymer particles containing the active catalyst located above a fluidisation grid.

The polymer bed is fluidised with the help of the fluidisation gas comprising propylene, comonomer(s), eventual chain growth controllers or chain transfer agents, such as hydrogen, and eventual inert gas. The fluidisation gas is introduced into an inlet chamber at the bottom of the reactor. To make sure that the gas flow is uniformly distributed over the cross-sectional surface area of the inlet chamber the inlet pipe may be equipped with a flow dividing element as known in the art, e.g. U.S. Pat. No. 4,933,149 and EP-A-684871. One or more of the above-mentioned components may be continuously added into the fluidisation gas to compensate for losses caused, among other, by reaction or product withdrawal.

From the inlet chamber the gas flow is passed upwards through the fluidisation grid into the fluidised bed. The purpose of the fluidisation grid is to divide the gas flow evenly through the cross-sectional area of the bed. Sometimes the fluidisation grid may be arranged to establish a gas stream to sweep along the reactor walls, as disclosed in WO-A-2005/087361. Other types of fluidisation grids are disclosed, among others, in U.S. Pat. No. 4,578,879, EP 600414 and EP-A-721798. An overview is given in Geldart and Bayens: The Design of Distributors for Gas-fluidised Beds, Powder Technology, Vol. 42, 1985.

The fluidisation gas passes through the fluidised bed. The superficial velocity of the fluidisation gas must be higher that minimum fluidisation velocity of the particles contained in the fluidised bed, as otherwise no fluidisation would occur. On the other hand, the velocity of the gas should be lower than the onset velocity of pneumatic transport, as otherwise the whole bed would be entrained with the fluidisation gas. The minimum fluidisation velocity and the onset velocity of pneumatic transport can be calculated when the particle characteristics are known by using common engineering practise. An overview is given, among others in Geldart: Gas Fluidisation Technology, J. Wiley & Sons, 1986.

When the fluidisation gas is contacted with the bed containing the active catalyst the reactive components of the gas, such as monomers and chain transfer agents, react in the presence of the catalyst to produce the polymer product. At the same time the gas is heated by the reaction heat.

The unreacted fluidisation gas is removed from the top of the reactor and cooled in a heat exchanger to remove the heat of reaction. The gas is cooled to a temperature which is lower than that of the bed to prevent the bed from heating because of the reaction. It is possible to cool the gas to a temperature where a part of it condenses. When the liquid droplets enter the reaction zone they are vaporised. The vaporisation heat then contributes to the removal of the reaction heat. This kind of operation is called condensed mode and variations of it are disclosed, among others, in WO-A-2007/025640, U.S. Pat. No. 4,543,399, EP-A-699213 and WO-A-94/25495. It is also possible to add condensing agents into the recycle gas stream, as disclosed in EP-A-696293. The condensing agents are non-polymerisable components, such as n-pentane, isopentane, n-butane or isobutane, which are at least partially condensed in the cooler.

The gas is then compressed and recycled into the inlet chamber of the reactor. Prior to the entry into the reactor fresh reactants are introduced into the fluidisation gas stream to compensate for the losses caused by the reaction and product withdrawal. It is generally known to analyse the composition of the fluidisation gas and introduce the gas components to keep the composition constant. The actual composition is determined by the desired properties of the product and the catalyst used in the polymerisation.

The catalyst may be introduced into the reactor in various ways, either continuously or intermittently. Among others, WO-A-01/05845 and EP-A-499759 disclose such methods. Where the gas phase reactor is a part of a reactor cascade the catalyst is usually dispersed within the polymer particles from the preceding polymerisation stage. The polymer particles may be introduced into the gas phase reactor as disclosed in EP-A-1415999 and WO-A-00/26258. Especially if the preceding reactor is a slurry reactor it is advantageous to feed the slurry directly into the fluidised bed of the gas phase reactor as disclosed in EP-A-887379, EP-A-887380, EP-A-887381 and EP-A-991684.

The polymeric product may be withdrawn from the gas phase reactor either continuously or intermittently. Combinations of these methods may also be used. Continuous withdrawal is disclosed, among others, in WO-A-00/29452. Intermittent withdrawal is disclosed, among others, in U.S. Pat. No. 4,621,952, EP-A-188125, EP-A-250169 and EP-A-579426.

The top part of the gas phase reactor may include a so called disengagement zone. In such a zone the diameter of the reactor is increased to reduce the gas velocity and allow the particles which are carried from the bed with the fluidisation gas to settle back to the bed.

The bed level may be observed by different techniques known in the art. For instance, the pressure difference between the bottom of the reactor and a specific height of the bed may be recorded over the whole length of the reactor and the bed level may be calculated based on the pressure difference values. Such a calculation yields a time-averaged level. It is also possible to use ultrasonic sensors or radioactive sensors. With these methods instantaneous levels may be obtained, which of course may then be averaged over time to obtain a time-averaged bed level.

Also antistatic agent(s) may be introduced into the gas phase reactor if needed. Suitable antistatic agents and methods to use them are disclosed, among others, in U.S. Pat. Nos. 5,026,795, 4,803,251, 4,532,311, 4,855,370 and EP-A-560035. They are usually polar compounds and include, among others, water, ketones, aldehydes and alcohols.

The reactor may also include a mechanical agitator to further facilitate mixing within the fluidised bed. An example of suitable agitator design is given in EP-A-707513.

Typically the fluidised bed polymerisation reactor is operated at a temperature within the range of from 50 to 100° C., preferably from 65 to 90° C. The pressure is suitably from 10 to 40 bar, preferably from 15 to 30 bar.

The polymerisation catalyst may be any suitable polymerisation catalyst known in the art which is capable of producing polypropylene and which has the desired stereo-selectivity. Thus, the catalyst can be a metallocene catalyst, such as those disclosed in EP-A-629631, EP-A-629632, WO-A-00/26266, WO-A-02/002576, WO-A-02/002575, WO-A-99/12943, WO-A-98/40331, EP-A-776913, EP-A-

1074557 and WO-A-99/42497 or a Ziegler-Natta catalyst, such as those disclosed in WO-A-2003/000757, WO-A-2003/000754, WO-A-2004/029112, WO-A-2007/137853, WO-A-2012/007430, EP-A-2610271, EP-A-261027 and EP-A-2610272. Preferably the catalyst is a Ziegler-Natta catalyst comprising a solid component, the solid component comprising magnesium, titanium, halogen and an internal electron donor; an aluminum alkyl compound; and an external electron donor.

The aluminum alkyl compound is preferably a trialkyl-aluminium, and is more preferably selected from the group consisting of triethylaluminium, tri-isobutylaluminium, trimethylaluminium, tri-n-hexylaluminium and tri-n-octyl-aluminium and their mixtures.

The external electron donor is preferably a silicon ether and is more preferably selected from the group consisting of dicyclopentyldimethoxysilane, cyclohexylmethyldimethoxysilane and diethylaminotriethoxysilane.

Nucleation by Polymeric Nucleating Agent

According to the present method the propylene copolymer (A) is nucleated by using a polymeric nucleating agent. One method for nucleating the propylene copolymer (A) with a polymeric nucleating agent includes prepolymerising the polymerisation catalyst by contacting the catalyst with a vinyl compound of the formula $CH_2=CH-CHR_6R_7$, wherein $R_6$ and $R_7$ together form a 5- or 6-membered saturated, unsaturated or aromatic ring or independently represent an alkyl group comprising 1 to 4 carbon atoms. Propylene is then copolymerised in the presence of such prepolymerised catalyst.

In the prepolymerisation the catalyst is prepolymerised so that it contains up to 5 grams of prepolymer per gram of solid catalyst component, preferably from 0.1 to 4 grams of prepolymer per one gram of the solid catalyst component. Then, the catalyst is contacted at polymerisation conditions with a vinyl compound of the formula $CH_2=CH-CHR_6R_7$, wherein $R_6$ and $R_7$ are as defined above. Especially preferably $R_6$ and $R_7$ then form a saturated 5- or 6-membered ring. Especially preferably the vinyl compound is vinylcyclohexane. Especially preferably the catalyst then contains from 0.5 to 2 grams of poly(vinylcyclohexane) per one gram of solid catalyst component. This allows the preparation of nucleated polypropylene as disclosed in EP-A-607703, EP-A-1028984, EP-A-1028985 and EP-A-1030878.

As described above, according to one method the propylene copolymer (A) is produced by copolymerising propylene and the comonomer in the presence of such prepolymerised catalyst.

The propylene copolymer is thereby nucleated by the polymeric nucleating agent. The propylene copolymer (A) then preferably comprises from 0.5 to 200 ppm of the polymeric nucleating agent, preferably poly(vinylcyclohexane), based on the weight of the propylene copolymer (A).

Alternatively, the propylene copolymer (A) is produced by copolymerising propylene and the comonomer in the presence of a polymerisation catalyst which has not been prepolymerised with the vinyl compound as disclosed above. In such case the propylene copolymer (A) is combined before or at the extrusion step with a propylene homo- or copolymer (B) which has been produced by homopolymerising propylene or copolymerising propylene and a comonomer in the presence of a catalyst which has been prepolymerised with the vinyl compound as referred to above. The propylene homo- or copolymer (B) then preferably comprises from 0.5 to 200 ppm, preferably from 1 to 200 ppm, of the polymeric nucleating agent, preferably poly(vinylcyclohexane), based on the weight of the propylene homo- or copolymer (B).

Where the propylene copolymer (A) is combined with the propylene homo- or copolymer (B) it is often preferred that the propylene homo- or copolymer (B) is relatively similar to the propylene copolymer (A). Thereby it is preferred that the propylene homo- or copolymer (B) is a propylene copolymer having approximately similar content of comonomer and approximately similar MFR as the propylene copolymer (A). However, when the amount of the propylene homo- or copolymer (B) in the composition comprising the propylene copolymer (A) and the propylene homo- or copolymer (B) is small, such as 5% by weight or less, like from 0.5 to 2% by weight, then the propylene homo- or copolymer (B) can have properties which are clearly different from those of the propylene copolymer (A).

Nucleation Effect

The effect of the nucleation can be monitored by the crystallization behaviour in a differential scanning calorimetry (DSC) measurement. Preferably, the composition comprising the propylene copolymer (A) and optionally the propylene homo- or copolymer (B) will have a crystallization temperature Tc as determined by DSC with a scan rate of 10° C./min of at least 108° C., preferably in the range of 110 to 130° C., more preferably in the range of 112 to 128° C., like in the range of 114 to 126° C.

Purging and Mixing

When the polymer has been removed from the polymerisation reactor it is subjected to process steps for removing residual hydrocarbons from the polymer. Such processes are well known in the art and can include pressure reduction steps, purging steps, stripping steps, extraction steps and so on. Also combinations of different steps are possible.

According to one preferred process a part of the hydrocarbons is removed from the polymer powder by reducing the pressure. The powder is then contacted with steam at a temperature of from 90 to 110° C. for a period of from 10 minutes to 3 hours. Thereafter the powder is purged with inert gas, such as nitrogen, over a period of from 1 to 60 minutes at a temperature of from 20 to 80° C.

According to another preferred process the polymer powder is subjected to a pressure reduction as described above. Thereafter it is purged with an inert gas, such as nitrogen, over a period of from 20 minutes to 5 hours at a temperature of from 50 to 90° C. The inert gas may contain from 0.0001 to 5%, preferably from 0.001 to 1%, by weight of components for deactivating the catalyst contained in the polymer, such as steam.

The purging steps are preferably conducted continuously in a settled moving bed. The polymer moves downwards as a plug flow and the purge gas, which is introduced to the bottom of the bed, flows upwards.

Suitable processes for removing hydrocarbons from polymer are disclosed in WO-A-02/088194, EP-A-683176, EP-A-372239, EP-A-47077 and GB-A-1272778.

After the purging steps the propylene copolymer powder is generally transferred to a powder silo where it is before extrusion. It is also possible to blend the propylene copolymer powder in the powder silo to make the material more homogeneous and eliminate the influence of disturbances and fluctuations during the production. Blending can be done according to the methods known in the art, such as according to the disclosure of Klaus-Peter Lang, Blending and Homogenising Bulk Materials in Silos, Bulk Materials Symposium, 25/26 Mar. 1993, or DE-102004018436.

Extrusion

The propylene copolymer powder is then passed to the extrusion step. In the extrusion step the propylene copolymer is melted and extruded through a die plate to strands. The strands are then cut in an underwater cutter to pellets.

The extruder is a twin screw extruder and preferably a co-rotating twin screw extruder. Such extruders are manufactured by, among others, Coperion (ZSK extruders), KraussMaffei Berstorff and Japan Steel Works.

The melt temperature in the extruder at or close to the die plate is typically adjusted to a range of from 190 to 250° C., preferably from 200 to 240° C. As it is known to the person skilled in the art the melt temperature is influenced by the specific energy input into the melt and can thus be controlled by adjusting, for instance, the throughput or the rotation speed of the screw.

One or more conventional additives for improving the performance of the olefin copolymer in the conversion process and end-use applications are added before or at the extrusion stage. Typically the additives are introduced into the feed port of the extruder together with the olefin copolymer. The conventional additives include antioxidants and process stabilisers, UV-stabilisers, heat stabilisers, slip agents, antiblocking agents, acid scavengers, metal deactivators, antimicrobial agents and antistatic agents. These conventional additives will normally be added in an amount of 1% by weight or less.

The propylene copolymer (A) is nucleated with a polymeric nucleating agent. As described above, the propylene copolymer (A) may be produced in the presence of the catalyst which has been prepolymerised with the vinyl compound of the formula $CH_2=CH-CHR_6R_7$ as defined above. Alternatively, the propylene homo- or copolymer (B) which has been produced in the presence of the catalyst which has been prepolymerised with the vinyl compound of the formula $CH_2=CH-CHR_6R_7$ as defined above is combined with the propylene copolymer (A) before or at the extrusion step.

If the propylene copolymer (A) has been produced by copolymerising propylene in the presence of a polymerisation catalyst which has been prepolymerised with the vinyl compound, then it is not necessary to have the propylene homo- or copolymer (B) present in the extrusion stage. However, if the propylene copolymer (A) has been produced by copolymerising propylene in the presence of a polymerisation catalyst which has not been prepolymerised with the vinyl compound then the addition of the propylene homo- or copolymer (B) is necessary.

When the propylene homo- or copolymer (B) is added at or before the extrusion step its amount can be from about 0.5 to about 40% by weight, based on the combined amount of propylene copolymer (A) and propylene homo- or copolymer (B). Preferably, the amount of propylene homo- or copolymer (B) is from 0.5 to 20% by weight and more preferably from 1 to 10% by weight, based on the combined amount of propylene copolymer (A) and the propylene homo- or copolymer (B). Thereby the amount of the polymeric nucleating agent in the composition comprising the propylene copolymer (A) and the propylene homo- or copolymer (B) is preferably from 0.01 to 100 ppm by weight, more preferably from 0.01 to 50 ppm by weight.

It has been surprisingly found that when the propylene copolymer (A) is nucleated with the polymeric nucleating agent as described above, then the pelletisation process works more smoothly and multiples (such as doublets) are not produced. Further, the agglomeration and adhesion tendency of the pellets in the subsequent process, like during the storage, is substantially reduced.

According to one embodiment the composition comprising the propylene copolymer (A) is subjected to viscosity reduction during the extrusion. The viscosity reduction is achieved by contacting the composition comprising the propylene copolymer (A) with a free-radical generator in the extruder. Thereby the propylene copolymer (A) is subjected to chain-scission reactions initiated by the free-radical generator.

As discussed above, the viscosity of the composition comprising the propylene copolymer (A) may be reduced during the extrusion. In such case it is, however, important that the range of the viscosity reduction, i.e., the difference between the starting viscosity and the end viscosity, is not too great. For the purpose of the present invention it has been found that if the viscosity reduction step is present then the change in the melt flow rate $MFR_2$ of the polymer is such that the ratio of the melt flow rate $MFR_{2,f}$ after the extrusion to the melt flow rate $MFR_{2,0}$, $MFR_{2,f}/MFR_{2,0}$, is within the range of from 1.2 to 5.0. Especially preferably the ratio is then from 1.5 to 3.0. As the person skilled in the art knows the above-mentioned ratio can be controlled by suitable selection of the free-radical generator or by adjusting the amount of the free-radical generator added to the extruder. A smaller amount of the free-radical generator generally leads to a smaller ratio.

The free-radical generator used in the viscosity reduction can be any free-radical generator known in the art. Examples of suitable groups of compounds are organic peroxides, inorganic peroxides, hydroperoxides and azo compounds. Suitable free-radical initiators are disclosed, among others, in U.S. Pat. Nos. 6,746,738, 7,312,280 and WO-A-1997/047682, disclosing the use of peroxides in grafting or crosslinking; and U.S. Pat. No. 622,967 disclosing the use of aminocarboxylic acids as comonomers in graft copolymerisation.

Examples of suitable peroxides which can be used in the present invention are organic peroxides and inorganic peroxides.

Suitable organic peroxides which may be used in the process of the present invention include acyl peroxides, dialkylperoxydicarbonates, (tert-alkyl)peroxyesters, (tert-alkyl, alkyl)mono-peroxycarbonates, di(tert-alkyl)peroxyketals, di(tert-alkyl)peroxides, (tert-alkyl) hydroperoxides and ketone peroxides. The free-radical generator may also be a mixture of two or more such compounds.

Examples of acyl peroxides are benzoyl peroxide, 4-chlorobenzoyl peroxide, 3-methoxybenzoyl peroxide and/or methyl benzoyl peroxide.

Examples of alkyl peroxides are allyl t-butyl peroxide, 2,2-bis(t-butylperoxybutane), 1,1-bis(t-butylperoxy)-3,3,5-trimethylcyclohexane, n-butyl-4,4-bis(t-butylperoxy) valerate, diisopropylaminomethyl-t-amyl peroxide, dimethylaminomethyl-t-amyl peroxide, diethylaminomethyl-t-butyl peroxide, dimethylaminomethyl-t-butyl peroxide, 1,1-di-(t-amylperoxy)cyclohexane, t-amyl peroxide, t-butylcumyl peroxide, dicumyl peroxide, t-butyl peroxide and/or 1-hydroxybutyl n-butyl peroxide.

Examples of peroxyesters and carbonates are butyl peracetate, cumyl peracetate, cumyl perpropionate, cyclohexyl peracetate, di-t-butyl peradipate, di-t-butyl perazelate, di-t-butyl perglutarate, di-t-butyl perthalate, di-t-butyl persebacate, 4-nitrocumyl perpropionate, 1-phenylethyl perbenzoate, phenylethyl nitro-perbenzoate, t-butylbicyclo-(2,2,1) heptane percarboxylate, t-butyl-4-carbomethoxy perbutyrate, t-butylcyclobutane percarboxylate, t-butylcyclohexyl peroxycarboxylate, t-butylcyclopentyl percarboxylate, t-butylcyclopropane percarboxylate, t-butyldimethyl percinnamate, t-butyl-2-(2,2-diphenylvinyl) perbenzoate, t-butyl-4-methoxy perbenzoate, t-butylperbenzoate, t-butylcarboxycyclohexane, t-butyl pernaphthoate, t-butyl peroxyisopropylcarbonate, t-butyl pertoluate, t-butyl-1-phenylcyclopropyl percarboxylate, t-butyl-2-propylperpentene-2-oate, t-butyl-1-methylcyclopropyl percarboxylate, t-butyl-4-nitrophenyl peracetate, t-butylnitrophenyl peroxycarbamate, t-butyl-N-succinimido percarboxylate, t-butyl percrotonate, t-butyl permaleic acid, t-butyl permethacrylate, t-butyl peroctoate, t-butyl peroxyisopropylcarbonate, t-butyl perisobutyrate, t-butyl peracrylate and/or t-butyl perpropionate.

Also inorganic peroxides, such as potassium persulfate, sodium persulfate or ammonium persulfate may be used.

Examples of suitable azo compounds are azobisisobutyronitrile, 2,2-azobis(2,4,4-trismethylvaleronitrile) and 2,2-azobis(2-cyclopropylpropionitrile).

The amount of the free-radical generator depends on the type and reactivity of the free-radical generator. For some peroxides good results have been obtained when the amount of the peroxide to the weight of the composition comprising the propylene copolymer (A) is from 0.003 to 1.0% by weight, such as from 0.005 to 0.1% by weight.

Pelletisation

The pellets are formed by extruding the polymer melt through the holes in the die plate to strands. The strands pass through the die plate into a water bath in an underwater pelletiser. At or immediately after the die plate there is a set of rotating knives which cut the strands to pellets. Water is continuously added to the bath and slurry comprising the water and the pellets is continuously withdrawn from the pelletiser. The slurry is then passed to a dryer, for instance a spin dryer, where the pellets are separated from the water. The pellets are recovered, stored and shipped to customers. The water is recovered, cooled and recycled to the pelletiser.

The die plate has a multiple of openings through which the molten polymer flows into the pelletiser. The openings have typically a diameter of from 2.0 to 3.0 mm so that the flow velocity of the polymer melt through the openings is from about 0.7 to 2.0 m/s, preferably from 0.8 to 1.5 m/s, such as 0.9 to 1.4 m/s.

As understood by the person skilled in the art the flow velocity (v) is calculated from the volumetric throughput ($Q_p$) and the total area of the holes ($A_{tot}$) in the die plate:

$$v = \frac{Q_p}{A_{tot}} = \frac{\dot{m}_p}{\rho_p \cdot N \cdot 0.25 \cdot \pi D^2}$$

In the equation above $m_p$ is the throughput in mass basis (kg/s), $\rho_p$ is the density of the polymer melt in extrusion conditions (kg/m$^3$), N is the number of holes in the die plate and D is the diameter of one hole in the die plate (m). The density of polypropylene melt can be taken as 878 kg/m$^3$.

The temperature of the pellet water in the pelletiser is preferably from 15 to 55° C., preferably from 20 to 50° C. Too high temperature may cause the pellets to be soft and increase their adhesion and agglomeration tendency. On the other hand cooling of the pellet water to a very low temperature is not economical. It has been found that when the pellet water temperature is within the above-mentioned limits the agglomeration tendency is on an acceptable level and no further improvement is achieved even though the water is cooled to lower temperatures.

It is further preferred that the ratio of the throughput to the flow rate of the pellet water is from 0.020 to 0.060 (kg/kg). More preferably the ratio is from 0.030 to 0.050, such as 0.035 to 0.050. When the ratio is within these limits the process provides sufficient cooling of the pellets with reasonable pellet water temperature. Furthermore, it has been found that maintaining the pellet to water ratio in these ranges results in a reduced number of pellet agglomerations. While the ratio could be reduced further without technical problems, the operation at lower pellet to water ratios is not preferred because it would lead to an uneconomical process where either a large amount of water needs to be recycled in the pellet water system or alternatively the throughput of the extruder would be restricted. Operation within the above-described limits has been found to provide a process where good operability and pellet quality is combined with good process economy.

The residence time of the pellets in the pelletiser and piping between the pelletiser and the dryer is preferably within the range of from 5 to 30 seconds, more preferably from 5 to 20 seconds and especially preferably from 7 to 15 seconds. When the residence time is within these limits it has been found that the number of agglomerations of pellets is reduced.

Benefits of the Invention

The present invention provides a process for pelletising soft copolymers of propylene where formation of agglomerated and fused pellets is reduced. Further, the pellets formed in the process can be handled, stored and transported without difficulty. The process can be operated in conventional apparatus without additional investment.

Description of Methods

Melt Flow Rate

The melt flow rate is measured as the MFR$_2$ in accordance with ISO 1133 15 (230° C., 2.16 kg load) for polypropylene and in accordance with ISO 1133 (190° C., 2.16 kg load) for polyethylene and is indicated in g/10 min. The MFR is an indication of the flowability, and hence the processability, of the polymer. The higher the melt flow rate, the lower the viscosity of the polymer.

Comonomer Content

Quantitative Fourier transform infrared (FTIR) spectroscopy was used to quantify the amount of comonomer. Calibration was achieved by correlation to comonomer contents determined by quantitative nuclear magnetic resonance (NMR) spectroscopy.

The calibration procedure based on results obtained from quantitative $^{13}$C-NMR spectroscopy was undertaken in the conventional manner well documented in the literature.

The amount of comonomer (N) was determined as weight percent (wt.-%) via:

$$N = k_1(A/R) + k_2$$

wherein A is the maximum absorbance defined of the comonomer band, R the maximum absorbance defined as peak height of the reference peak and with $k_1$ and $k_2$ the linear constants obtained by calibration. The band used for ethylene content quantification is selected depending if the ethylene content is random (730 cm$^{-1}$) or block-like (720 cm$^{-1}$). The absorbance at 4324 cm$^{-1}$ was used as a reference band.

As it is well known to the person skilled in the art the comonomer content in weight basis in a binary copolymer can be converted to the comonomer content in mole basis by using the following equation:

$$c_m = \frac{1}{1+\left(\frac{1}{c_w}-1\right)\cdot\frac{MW_c}{MW_m}}$$

where $c_m$ is the mole fraction of comonomer units in the copolymer, $c_w$ is the weight fraction of comonomer units in the copolymer, $MW_c$ is the molecular weight of the comonomer (such as ethylene) and $MW_m$ is the molecular weight of the main monomer (i.e., propylene).

Xylene Cold Soluble (XCS) Fraction

The amount of the polymer soluble in cold xylene is determined at 25° C. according to ISO 16152; 5$^{th}$ edition; 2005 Jul. 1.

Differential Scanning Calorimetry (DSC) Analysis

Melting temperature (Tm) and melting enthalpy (Hm), crystallization temperature (Tc) and crystallization enthalpy (Hc) are measured with a TA Instrument Q200 differential scanning calorimetry (DSC) on 5 to 7 mg samples. DSC is run according to ISO 11357/part 3/method C2 in a heat/cool/heat cycle with a scan rate of 10° C./min in the temperature range of −30 to +225° C. Crystallization temperature and crystallization enthalpy (Hc) are determined from the cooling step, while melting temperature and melting enthalpy (Hm) are determined from the second heating step.

EXAMPLES

Catalyst Preparation 1
Preparation of the Solid Component

First, 0.1 mol of MgCl$_2$×3 EtOH was suspended under inert conditions in 250 ml of decane in a reactor at atmospheric pressure. The solution was cooled to the temperature of −15° C. and 300 ml of cold TiCl$_4$ was added while maintaining the temperature at said level. Then, the temperature of the slurry was increased slowly to 20° C. At this temperature, 0.02 mol of dioctylphthalate (DOP) was added to the slurry. After the addition of the phthalate, the temperature was raised to 135° C. during 90 minutes and the slurry was allowed to stand for 60 minutes. Then, another 300 ml of TiCl$_4$ was added and the temperature was kept at 135° C. for 120 minutes. After this, the catalyst was filtered from the liquid and washed six times with 300 ml heptane at 80° C. Then, the solid catalyst component was filtered and dried.

Prepolymerisation with Vinylcyclohexane

Triethylaluminium (TEAL), dicyclopentyldimethoxysilane (DCPDMS) as donor (Do), catalyst as produced above and vinylcyclohexane (VCH) were added into oil, e.g. Technol 68, provided in amounts so that Al/Ti was 3-4 mol/mol, Al/Do was as well 3-4 mol/mol, and weight ratio of VCH/solid catalyst was 1/1. The mixture was heated to 60-65° C. and allowed to react until the content of the unreacted vinylcyclohexane in the reaction mixture was less than 1000 ppm. Catalyst concentration in the final oil-catalyst slurry was 10-20 wt-%.

Catalyst Preparation 2
Preparation of the Solid Component

First, 0.1 mol of MgCl$_2$×3 EtOH was suspended under inert conditions in 250 ml of decane in a reactor at atmospheric pressure. The solution was cooled to the temperature of −15° C. and 300 ml of cold TiCl$_4$ was added while maintaining the temperature at said level. Then, the temperature of the slurry was increased slowly to 20° C. At this temperature, 0.02 mol of dioctylphthalate (DOP) was added to the slurry. After the addition of the phthalate, the temperature was raised to 135° C. during 90 minutes and the slurry was allowed to stand for 60 minutes. Then, another 300 ml of TiCl$_4$ was added and the temperature was kept at 135° C. for 120 minutes. After this, the catalyst was filtered from the liquid and washed six times with 300 ml heptane at 80° C. Then, the solid catalyst component was filtered and dried and used in the polymerisation.

Comparative Example 1

A stirred tank reactor having a volume of 40 dm$^3$ was operated as liquid-filled at a temperature of 28° C. and a pressure of 54 bar. Into the reactor was fed propylene (70 kg/h) so much that the average residence time in the reactor was 0.3 hours and hydrogen so that the feed ratio of hydrogen to propylene was 0.1 mol/kmol and 2.6 g/h of a polymerization catalyst prepared according to Catalyst Preparation 1 above with triethyl aluminum (TEA) as a cocatalyst and dicyclopentyldimethoxysilane (DCPDMS) as external donor so that the molar ratio of TEA/Ti was about 130 mol/mol and TEA/DCPDMS was 130 mol/mol.

The slurry from this prepolymerisation reactor was directed to a loop reactor having a volume of 150 dm$^3$ together with 145 kg/h of propylene and hydrogen and ethylene so that the MFR$_2$ of the propylene copolymer was 1 g/10 min and the ethylene content was 2% by weight. The loop reactor was operated at a temperature of 80° C. and a pressure of 54 bar. The production rate of propylene copolymer was 25 kg/h.

The polymer slurry from the loop reactor was directly conducted into a first gas phase reactor operated at a temperature of 75° C. and a pressure of 27 bar. Into the reactor were fed additional propylene, hydrogen and ethylene. The production rate in the reactor was 22 kg/h and the copolymer withdrawn from the reactor had a melt flow rate MFR$_2$ of 1 g/10 min and an ethylene content of 5.5% by weight. The XCS of the copolymer was 12%. The split of the polymer produced in the loop reactor to the polymer produced in the gas phase reactor was 53:47.

The polymer from the first gas phase reactor was conducted into a second gas phase reactor operated at a temperature of 75° C. and a pressure of 24 bar. Into the reactor were fed additional propylene, hydrogen and ethylene. The production rate in the reactor was 8 kg/h and the copolymer withdrawn from the reactor had a melt flow rate MFR$_2$ of 1 g/10 min and an ethylene content of 11% by weight. The XCS of the copolymer was 25%. The split of the polymer produced in the loop reactor and the first gas phase reactor to the polymer produced in the second gas phase reactor was 87:13.

The polymer from the second gas phase reactor was conducted into a third gas phase reactor operated at a temperature of 75° C. and a pressure of 22 bar. Into the reactor were fed additional propylene, hydrogen and ethylene. The production rate in the reactor was 7 kg/h and the copolymer withdrawn from the reactor had a melt flow rate MFR$_2$ of 1 g/10 min and an ethylene content of 15% by weight. The XCS of the copolymer was greater than 40%. The split of the polymer produced in the loop reactor, the first gas phase reactor and the second gas phase to the polymer produced in the third gas phase reactor was 88:12.

The polymer was withdrawn from the reactor and mixed with effective amounts of Irgafos 168, Irganox 1010 and calcium stearate. Further, into the polymer were mixed 2,5-dimethyl-2,5-di-(tert-butylperoxy)-hexane so that its content in the propylene copolymer was 100 ppm based on the weight of the propylene copolymer.

The mixture of polymer and additives produced according to the description above was extruded to pellets by using a ZSK380 extruder (product of Coperion) with L/D of 35. The throughput was 28 tons per hour and the specific energy input was 180 kWh/ton. The melt temperature at the die plate was 265° C.

The polymer melt was extruded through a die plate into an underwater cutter where the temperature of the pellet water was 35° C. The pellet water flow was 455 m³/h, leading to pellet to water weight ratio of 0.061 and pellet residence time of 15.8 seconds.

The pellets were recovered, dried and analysed. The pelletised copolymer had $MFR_2$ of 3.8 g/10 min. The polymer contained about 100 ppm of poly(vinylcyclohexane) (PVCH). Differential scanning calorimetry (DSC) analysis gave a melting temperature (Tm) of 149° C., a melting enthalpy (Hm) of 52 J/g, a crystallization temperature (Tc) of 120° C. and a crystallization enthalpy of 53 J/g.

Comparative Example 2

The procedure of Comparative Example 1 was repeated except that the $MFR_2$ of the polymer produced in the loop reactor was 6 g/10 min, the $MFR_2$ of the polymer recovered after each of the gas phase reactors was about 1.7 g/10 min and the amount of 2,5-dimethyl-2,5-di-(tert-butylperoxy)-hexane was 80 ppm. The polymer contained about 100 ppm of PVCH. Differential scanning calorimetry (DSC) analysis gave a melting temperature (Tm) of 149° C. and a crystallization temperature (Tc) of 118° C.

Example 1

A stirred tank reactor having a volume of 40 dm³ was operated as liquid-filled at a temperature of 28° C. and a pressure of 54 bar. Into the reactor was fed propylene (70 kg/h) so much that the average residence time in the reactor was 0.3 hours and hydrogen so that the feed ratio of hydrogen to propylene was 0.1 mol/kmol and 2.6 g/h of a polymerization catalyst prepared according to Catalyst Preparation 2 above with triethyl aluminum (TEA) as a cocatalyst and dicyclopentyldimethoxysilane (DCPDMS) as external donor so that the molar ratio of TEA/Ti was about 130 mol/mol and TEA/DCPDMS was 130 mol/mol.

The slurry from this prepolymerisation reactor was directed to a loop reactor having a volume of 150 dm³ together with 145 kg/h of propylene and hydrogen and ethylene so that the $MFR_2$ of the propylene copolymer was 6 g/10 min and the ethylene content was 2% by weight. The loop reactor was operated at a temperature of 80° C. and a pressure of 54 bar. The production rate of propylene copolymer was 25 kg/h.

The polymer slurry from the loop reactor was directly conducted into a first gas phase reactor operated at a temperature of 75° C. and a pressure of 24 bar. Into the reactor were fed additional propylene, hydrogen and ethylene. The production rate in the reactor was 22 kg/h and the copolymer withdrawn from the reactor had a melt flow rate $MFR_2$ of 1.7 g/10 min and an ethylene content of 6.5% by weight. The XCS of the copolymer was 22%. The split of the polymer produced in the loop reactor to the polymer produced in the gas phase reactor was 53:47.

The polymer from the first gas phase reactor was conducted into a second gas phase reactor operated at a temperature of 75° C. and a pressure of 20 bar. Into the reactor were fed additional propylene, hydrogen and ethylene. The production rate in the reactor was 13 kg/h and the copolymer withdrawn from the reactor had a melt flow rate $MFR_2$ of 1.5 g/10 min and an ethylene content of 15% by weight. The XCS of the copolymer was 43%. The split of the polymer produced in the loop reactor and the first gas phase reactor to the polymer produced in the second gas phase reactor was 78:22.

The mixture of polymer and additives produced according to the description above was extruded to pellets by using a CMP362 extruder (product of Japan Steel Works) with L/D of 32. Further, into the polymer were mixed 2,5-dimethyl-2,5-di-(tert-butylperoxy)-hexane so that its content in the propylene copolymer was 80 ppm based on the weight of the propylene copolymer. Additionally, into the polymer powder was added pellets made of the polymer produced according to the disclosure of Comparative Example 1 above so that the amount of the pellets of Comparative Example 1 was 2 parts per 100 parts of the copolymer powder of Example 1. The throughput was 34 tons per hour and the specific energy input was 130 kWh/ton. The melt temperature at the die plate was 230° C.

The polymer melt was extruded through a die plate into an underwater cutter where the temperature of the pellet water was 35° C. The pellet water flow was 890 m³/h, leading to pellet to water ratio of 0.038 and pellet residence time of 7.5 seconds. The velocity of the melt in the die was 1.1 m/s.

The pellets were recovered, dried and analysed. The pelletised copolymer had $MFR_2$ of 3.8 g/10 min. The pelletised polymer contained about 2 ppm of PVCH. Differential scanning calorimetry (DSC) analysis gave a melting temperature (Tm) of 149° C., a melting enthalpy (Hm) of 52 J/g, a crystallization temperature (Tc) of 116° C. and a crystallization enthalpy of 53 J/g.

Comparative Example 3

The procedure of Example 1 was repeated except that the polymer of Comparative Example 1 was not added.

In addition the extrusion and pelletisation conditions were changed so that throughput was 38 tons per hour. The melt temperature at the die plate was 190° C.

The polymer melt was extruded through a die plate into an underwater cutter where the temperature of the pellet water was 35° C. The pellet water flow was 890 m³/h, leading to pellet to water ratio of 0.043 and pellet residence time of 7.5 seconds. The velocity of the melt in the die was 1.3 m/s.

The pellets were recovered, dried and analysed. The pelletised copolymer had $MFR_2$ of 3.8 g/10 min. The polymer did not contain PVCH. Differential scanning calorimetry (DSC) analysis gave a melting temperature (Tm) of 149° C. and a crystallization temperature (Tc) of 102° C.

Example 2

The procedure of Example 1 was repeated except that the catalyst used in producing the polymer was made according to Catalyst Preparation 1 and the polymer of Comparative Example 1 was not added in the extruder.

In addition the extrusion and pelletisation conditions were changed so that throughput was 39 tons per hour. The melt temperature at the die plate was 180° C.

The polymer melt was extruded through a die plate into an underwater cutter where the temperature of the pellet water was 35° C. The pellet water flow was 940 m³/h, leading to pellet to water ratio of 0.041 and pellet residence time of 7.1 seconds. The velocity of the melt in the die was 1.3 m/s.

The pellets were recovered, dried and analysed. The pelletised copolymer had $MFR_2$ of 3.8 g/10 min. The polymer contained about 100 ppm of PVCH. Differential scanning calorimetry (DSC) analysis gave a melting temperature (Tm) of 149° C. and a crystallization temperature (Tc) of 120° C.

TABLE 1

Pelletisation data

| | Example | | | | |
|---|---|---|---|---|---|
| | C1 | C2 | 1 | C3 | 2 |
| Melt temperature, ° C. | 265 | 265 | 230 | 230 | 230 |
| Pellet/water ratio | 0.061 | 0.061 | 0.038 | 0.043 | 0.041 |
| Melt velocity, m/s | N/D | N/D | 1.1 | 1.3 | 1.3 |
| Pellet water temperature, ° C. | 35 | 35 | 35 | 35 | 35 |
| Residence time, s | 16 | 16 | 7.5 | 7.5 | 7.1 |
| PVCH | Yes | Yes | Yes | No | Yes |
| $MFR_2$, g/10 min | 3.8 | 3.8 | 3.8 | 3.8 | 3.8 |
| Tm, ° C. | 149 | 148 | 149 | 149 | 149 |
| Tc, ° C. | 120 | 118 | 116 | 102 | 120 |
| Agglomerated pellets, % | 7 | 2.5 | 0.7 | 1.6 | 0.8 |

The invention claimed is:

1. A process for extruding and pelletising a propylene copolymer (A) having a content of comonomer from 5 to 40% by mole, a melt flow rate $MFR_2$ measured at 230° C. under a load of 2.16 kg of from 0.5 to 15 g/10 min and a content of xylene cold soluble fraction of from 20 to 60% by weight, said process comprising extruding the propylene copolymer through a die plate into an underwater pelletiser and cutting strands of the propylene copolymer into pellets in the underwater pelletiser,
wherein the ratio of the mass flow rate of the propylene copolymer to the mass flow rate of the cooling water is from 0.020 to 0.060; and the propylene copolymer comprises a polymeric nucleating agent in an amount of from 50 to 100 ppm, based on the weight of the propylene copolymer (A),
wherein propylene copolymer (A) and the polymeric nucleating agent yield a composition, produced by
(i) contacting a vinyl compound having the formula $CH_2$=$CHCHR_2R_3$ with a polymerisation catalyst, under polymerisation conditions, thereby polymerising the vinyl compound on the polymerisation catalyst and producing a modified polymerisation catalyst;
(ii) contacting the modified polymerisation catalyst with propylene and a comonomer under polymerisation conditions, thereby producing a nucleated copolymer (A) of propylene, and
wherein the residence time of the pellets in the pelletiser and piping between the pelletiser and a dryer is within the range of from 5 to 15 seconds.

2. The process according to claim 1 wherein in formula $CH_2$=CH—$CHR_2R_3$, $R_2$ and $R_3$ together form a 5- or 6-membered saturated, unsaturated or aromatic ring or independently represent an alkyl group comprising 1 to 4 carbon atoms.

3. The process according to claim 1 wherein the polymeric nucleating agent is a polymer of a vinyl compound selected from the group consisting of vinyl cyclohexane (VCH), vinyl cyclopentane, vinyl-2-methyl cyclohexane, 3-methyl-1-butene, 3-ethyl-1-hexene, 3-methyl-1-pentene, 4-methyl-1-pentene and mixtures thereof.

4. The process according to claim 1 wherein the polymeric nucleating agent is a polymer of a vinyl cyclohexane.

5. The process according to claim 2 wherein the process includes the additional steps of
(i) contacting the vinyl compound having the formula CH2=$CHCHR_2R_3$ with a polymerisation catalyst, under polymerisation conditions, thereby polymerising the vinyl compound on the polymerisation catalyst and producing a modified polymerisation catalyst;
(ii) contacting the modified polymerisation catalyst with propylene, under polymerisation conditions, thereby producing a nucleated homo- or copolymer (B) of propylene; and
(iii) introducing the nucleated homo- or copolymer of propylene (B) into the extruder.

6. The process according to claim 2, wherein the process includes the additional steps of
(i) contacting the vinyl compound having the formula $CH_2$=$CHCHR_2R_3$ with a polymerisation catalyst, under polymerisation conditions, thereby polymerising the vinyl compound on the polymerisation catalyst and producing a modified polymerisation catalyst;
(ii) contacting the modified polymerisation catalyst with propylene, under polymerisation conditions, thereby producing a nucleated homo- or copolymer (B) of propylene; and
(iii) introducing the nucleated homo- or copolymer of propylene (B) into the extruder, and wherein the amount of the nucleated homo- or copolymer of propylene (B) is from 0.5 to 40% by weight of the composition comprising the propylene copolymer (A) and the propylene homo- or copolymer (B).

7. The process according to claim 2 wherein the process includes the additional steps of
(i) contacting the vinyl compound having the formula $CH_2$=$CHCHR_2R_3$ with a polymerisation catalyst, under polymerisation conditions, thereby polymerising the vinyl compound on the polymerisation catalyst and producing a modified polymerisation catalyst;
(ii) contacting the modified polymerisation catalyst with propylene, under polymerisation conditions, thereby producing a nucleated homo- or copolymer (B) of propylene; and
(iii) introducing the nucleated homo- or copolymer of propylene (B) into the extruder, and wherein the content of the polymeric nucleating agent in the composition comprising the propylene copolymer (A) and the nucleated homo- or copolymer of propylene (B) is from 0.01 to 50 ppm based on the weight of the composition.

8. The process according to claim 1 wherein the ratio of the mass flow rate of the propylene copolymer to the mass flow rate of the cooling water is from 0.030 to 0.050.

9. The process according to claim 1 wherein the ratio of the mass flow rate of the propylene copolymer to the mass flow rate of the cooling water is from 0.035 to 0.050.

10. The process according to claim 1 wherein the temperature of the pellet water is from 15 to 55° C.

11. The process according to claim 1 wherein the temperature of the pellet water is from 20 to 50° C.

12. The process according to claim 1 comprising the additional steps of contacting propylene and the comonomer with a polymerisation catalyst, in the polymerisation conditions in at least one polymerisation stage to produce the copolymer having a first melt flow rate, $MFR_{2,0}$, of from 0.2 to 8 g/10 min and introducing the copolymer into the extruder; introducing a free-radical generator into the extruder; extruding the copolymer in the presence of the free-radical generator; wherein the amount of the free-radical generator is such that ratio of the melt flow rate of the pellets, $MFR_{2,f}$, to the first melt flow rate, $MFR_{2,0}$, $MFR_{2,f}/MFR_{2,0}$, is from 1.2 to 5.0.

13. The process according to claim 1 comprising the additional steps of, contacting propylene and the comonomer with a polymerisation catalyst, in the polymerisation conditions in at least one polymerisation stage to produce the copolymer having a first melt flow rate, $MFR_{2,0}$, of from 0.2 to 8 g/10 min and introducing the copolymer into the extruder; introducing a free-radical generator into the extruder; extruding the copolymer in the presence of the free-radical generator; wherein the amount of the free-radical generator is such that ratio of the melt flow rate of the pellets, $MFR_{2,f}$, to the first melt flow rate, $MFR_{2,f}/MFR_{2,0}$, is from 1.5 to 3.0.

14. The process according to claim 1 wherein the composition comprising the propylene copolymer (A) has a crystallization temperature Tc as determined by DSC with a scan rate of 10° C./min in the range of 114 to 126° C.

15. The process according to claim 1 wherein the polymeric nucleating agent is a homopolymer of a vinyl compound having the formula $CH_2=CH-CHR_2R_3$, wherein $R_2$ and $R_3$ together form a 5- or 6-membered saturated, unsaturated or aromatic ring or independently represent an alkyl group comprising 1 to 4 carbon atoms.

16. The process according to claim 1 wherein the polymeric nucleating agent is a homopolymer of a vinyl compound is selected from the group consisting of vinyl cyclohexane (VCH), vinyl cyclopentane, vinyl-2-methyl cyclohexane, 3-methyl-1-butene, 3-ethyl-1-hexene, 3-methyl-1-pentene, 4-methyl-1-pentene and mixtures thereof.

17. The process according to claim 1 wherein the polymeric nucleating agent is a homopolymer of vinyl cyclohexane.

18. A process for extruding and pelletising a propylene copolymer (A) having a content of comonomer from 5 to 40% by mole, a melt flow rate $MFR_2$ measured at 230° C. under a load of 2.16 kg of from 0.5 to 15 g/10 min and a content of xylene cold soluble fraction of from 20 to 60% by weight, said process comprising extruding the propylene copolymer through a die plate into an underwater pelletiser and cutting strands of the propylene copolymer into pellets in the underwater pelletiser,
wherein the ratio of the mass flow rate of the propylene copolymer to the mass flow rate of the cooling water is from 0.020 to 0.060; and the propylene copolymer comprises a polymeric nucleating agent in an amount of from 50 to 100 ppm, based on the weight of the propylene copolymer (A),
wherein propylene copolymer (A) and the polymeric nucleating agent yield a composition, and
wherein the residence time of the pellets in the pelletiser and piping between the pelletiser and a dryer is within the range of from 5 to 15 seconds,
wherein the polymeric nucleating agent is a polymer of a vinyl compound having the formula $CH_2=CHCHR_2R_3$, wherein $R_2$ and $R_3$ together form a 5- or 6-membered saturated, unsaturated or aromatic ring or independently represent an alkyl group comprising 1 to 4 carbon atoms.

19. The process according to claim 18 wherein the composition comprising the propylene copolymer (A) has a crystallization temperature Tc as determined by DSC with a scan rate of 10° C./min in the range of 114 to 126° C.

* * * * *